May 6, 1941.  W. E. DEAN  2,240,610
CONVERTIBLE SEED PLANTING HOPPER
Original Filed Nov. 30, 1936  2 Sheets-Sheet 1
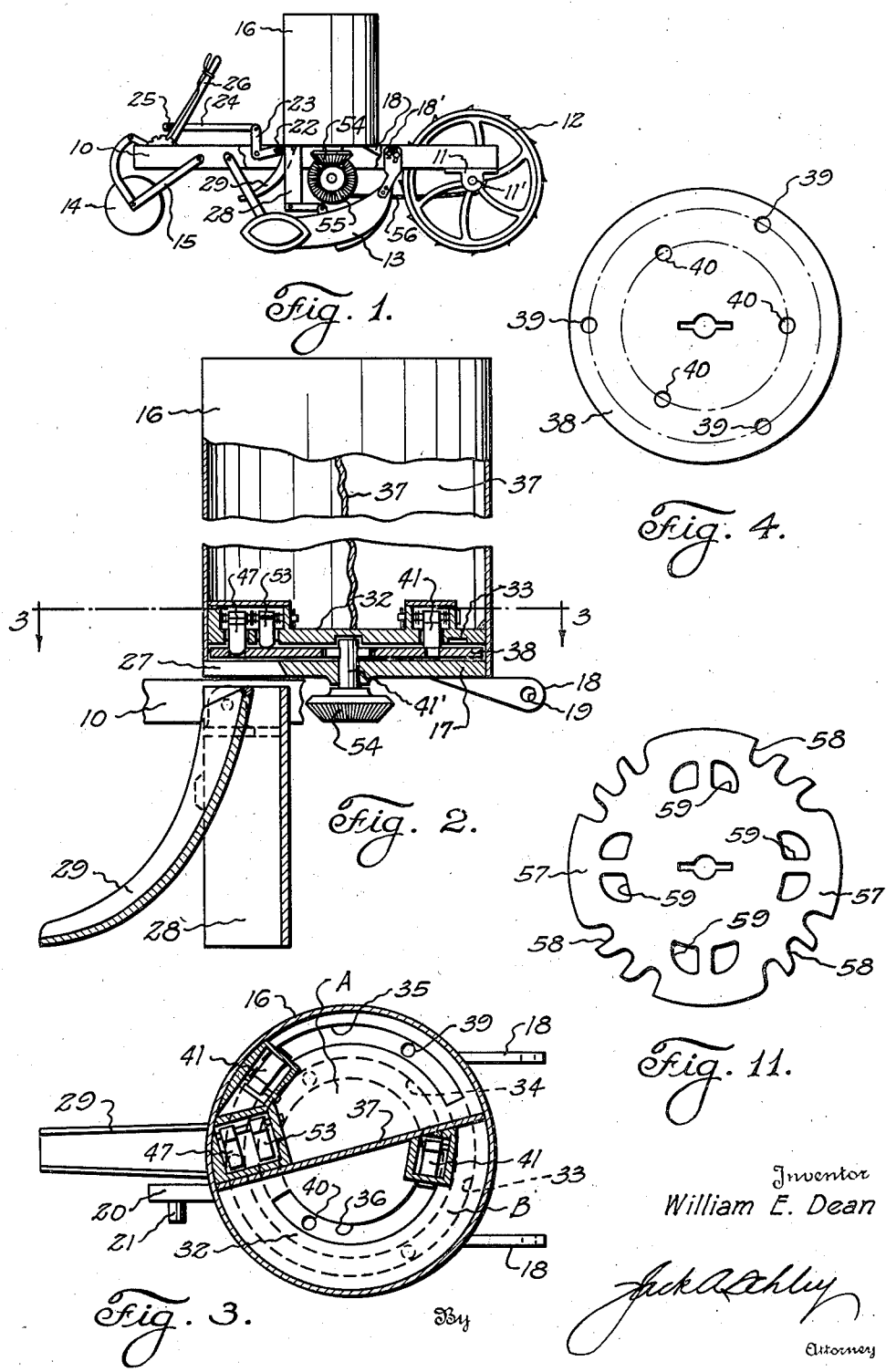
Inventor
William E. Dean
Attorney May 6, 1941.   W. E. DEAN   2,240,610
CONVERTIBLE SEED PLANTING HOPPER
Original Filed Nov. 30, 1936   2 Sheets-Sheet 2
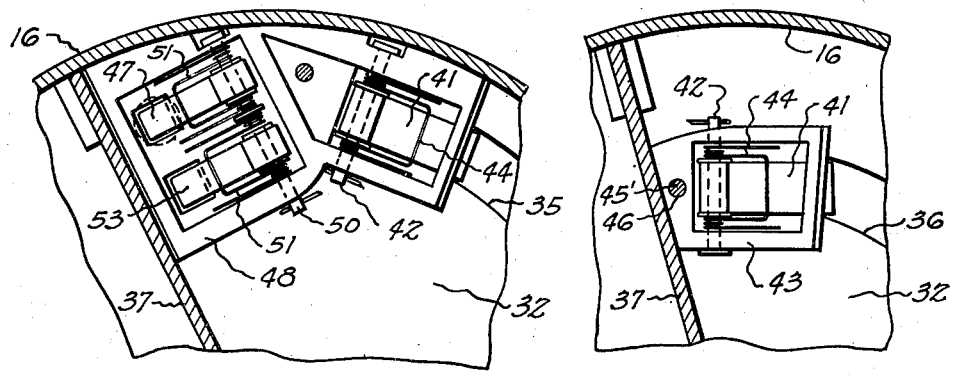
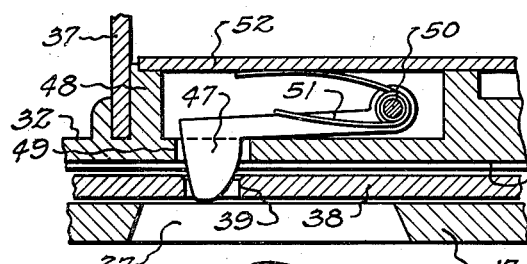
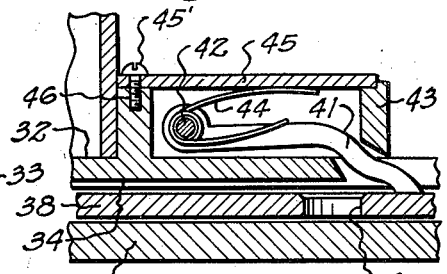
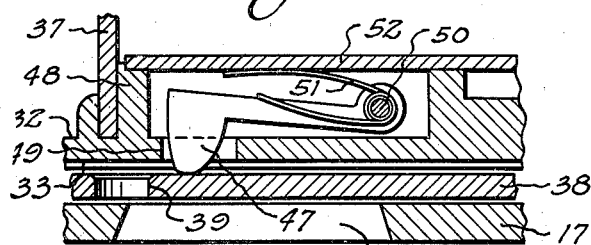
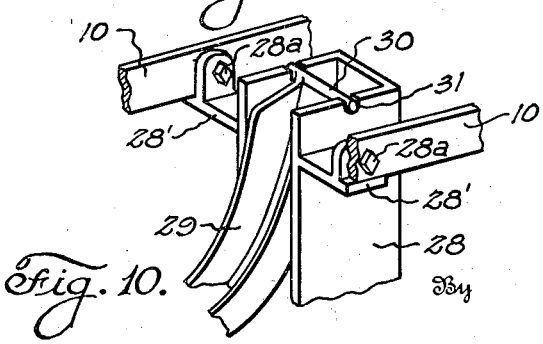
Inventor
William E. Dean
By Jack A. Ashley
Attorney Patented May 6, 1941

2,240,610

UNITED STATES PATENT OFFICE 2,240,610

CONVERTIBLE SEED PLANTING HOPPER

William E. Dean, Portland, Ark.

Original application November 30, 1936, Serial No. 113,288. Divided and this application November 25, 1938, Serial No. 242,157

2 Claims. (Cl. 221—125)

This invention relates to new and useful improvements in convertible seed planting hoppers.

This application is filed as a divisional application of my co-pending application filed November 30, 1936, Serial No. 113,288.

One object of the invention is to provide an improved convertible hopper for planting seeds, which is adapted to be used as a single or double hopper.

An important object of the invention is to provide an improved hopper having a plurality of compartments each having an individual outlet with means for ejecting the seed from each compartment to its respective outlet in a desired order, whereby the seeds may be dropped from the compartments in any desired order.

A further object of the invention is to provide an improved convertible hopper which is so constructed that one or more species or varieties of seed may be planted in the same furrow at the same time, whereby the necessity of passing the planting device over the same ground twice is eliminated.

A particular object of the invention is to provide an improved convertible hopper for planters which includes a stationary plate having openings therein and a movable plate also having openings, the latter plate being arranged to co-act with the stationary plate so as to register the openings in said plates to permit seed to enter and pass through said openings, together with positive means carried by the stationary plate for ejecting the seed from the openings in the movable plate.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a side elevation of a hopper, constructed in accordance with the invention, and mounted on a planting device, Figure 2 is a view, partly in elevation and partly in section, of the hopper, Figure 3 is a horizontal, cross-sectional view, taken on the line 3—3 of Figure 2, Figure 4 is a plan view of the distributing plate of the hopper, Figure 5 is a partial plan view of the cover plate showing the ejection dogs and wipers, Figure 6 is a transverse, vertical, sectional view taken through one of the ejection dogs and showing said dogs in their lowermost position, Figure 7 is a similar view showing the dog swung to its raised position, Figure 8 is a partial plan view of the cover plate which forms the bottom of the hopper and showing one of the wiper elements, Figure 9 is a transverse, vertical, sectional view taken through one of the wipers, Figure 10 is a partial isometric view of one of the distributing chutes, and Figure 11 is a plan view of another form of a distributing plate.

In the drawings, the numeral 10 designates a frame which is formed of longitudinally extending frame bars which are suitably connected together and spaced from each other by transverse bracing members. The underside of the forward end of each bar is provided with suitable bearing boxes 11 and a transverse axle 11' is mounted in said boxes and carried by the forward end of the frame. A suitable traction wheel 12 is mounted on the mid-portion of the transverse axle 11' and a suitable plow 13 which is adapted to engage the ground to cut a furrow is disposed behind the wheel. For supporting the rear end of the frame 10 a small wheel 14 is journaled on a transverse shaft and the outer ends of said shaft are secured to the lower ends of pivoted arms 15, the upper ends of the arms being pivoted to the frame. The arms are connected to a hand lever 26 which is mounted on the frame and when the lever is swung the wheel is raised or lowered. The method for raising and lowering the wheel 14 has been set out in my co-pending application Serial No. 113,288 and forms no part of the present invention.

Mounted on the frame 10 is a cylindrical hopper 16 having its upper end open while its lower end is closed by a transverse bottom 17. This bottom is provided with forwardly extending spaced lugs 18 which have openings 19 therein, whereby a transverse shaft 18' extending between the frame bars of the frame may pass through said opening to pivotally mount the hopper on said shaft. A single lug 20, having a pin 21 extending from one side thereof, is provided on the lower end of the hopper at its rear peripheral edge as shown in Figure 3. This pin engages within a slot 22 in one arm of a bell crank lever 23, which lever is pivoted to one of the frame bars. The other arm of the bell crank lever is pivotally connected with one end of an elongated actuating bar 24 and the opposite end of this bar is provided with an elongate slot 25, through which a pin on the hand lever 26 extends. Thus, it will be seen that when the hand lever is swung to raise or lower the wheel 14, the bell crank 23 will be swung through the medium of the actuating bar 24, whereby the rear end of the hopper will be raised or lowered to swing the hopper.

The bottom 17 of the hopper (Figure 2) is provided with an opening or slot 27 which is located at the periphery thereof adjacent the lug 20. The walls of the slot are inclined so that said slot is larger at the bottom than the top, whereby clogging of the same is prevented. Extending downwardly from this opening or slot 27 are a pair of chutes 28 and 29, as clearly shown in Figure 2. The chute 28 is substantially vertical and has its lower end located just above the rear portion of the plow 13. The upper end of the chute 28 has outwardly extending angular ears 28' which are fastened by bolts 28a to the frame 10 beneath the hopper. The other chute 29 is curved rearwardly so that its outlet or lowermost end is located at a rearwardly position of the plow 13. As can be seen in Figure 10, the uppermost end of the chute 29 is provided with a transverse pin 30 which engages in notches 31 provided in the upper end of the chute 28. Thus it can be seen that the chute 29 is free to swing with relation to the chute 28, so as to permit independent movement of the chute 29 in case an obstruction or obstacle strikes said chute.

For distributing the seed to the chutes 28 and 29, a circular cover plate 32 is located within the hopper 16, being suitably fastened therein by welding, or otherwise. This cover plate, as clearly shown in Figure 2, is spaced from the bottom 17 of the hopper and it will be obvious that seeds dropped into said hopper will fall onto this cover plate. The cover plate (Figure 3) is formed with a pair of annular grooves 33 and 34 in its underside, which grooves are angular in cross-section. The groove 33 is formed on a greater radius than is the groove 34 whereby the grooves are concentric and said outer groove 33 has a portion thereof cut completely through the plate to form an arcuate slot 35 which extends entirely through the plate, while a similar arcuate slot 36 is provided in alinement with the groove 34. A transverse, vertical partition 37 extends diametrically across the interior of the hopper and, as is clearly shown in Figure 3, separates the slot 35 from the slot 36, whereby the hopper is divided into two compartments A and B.

The seed which is introduced into the compartment A will drop into the slot 35, while the seed which is introduced into the compartment B will fall into the arcuate slot 36. Disposed between the cover plate 32 and the bottom 17 of the hopper is a distributing plate 38. This plate will vary in construction according to the seed which is to be planted and one type of plate is shown in Figure 4. This plate is for planting corn and beans and the plate is circular, having substantially the same diameter as the hopper, and is provided with a trio of openings 39 which are located near its periphery, all of the openings 39 being located on the same radii. A second trio of openings or holes 40 are also formed in the plate and are disposed on a smaller radii than are the openings 39. The openings 39 and 40 are so positioned that the latter register with the inner groove 34 and inner slot 36. Therefore, it will be obvious that with the distributing plate 38 in position between the cover plate 32 and the top of the bottom 17, the openings 40 being in registration with the slot 36 will receive seeds which have been introduced into the compartment B and have fallen into said slot 36. Similarly, seed introduced into the compartment A fall into the slot 35 and will thus enter the openings 39 in the distributing plate. The seed which has entered these openings 39 and 40 cannot fall through such openings because the bottom of the hopper 17 is located contiguous to the underside of the distributing plate 38.

The distributing plate 38 is provided with an axial opening, through which a vertical stub shaft 41' extends. The stub shaft is suitably mounted in the bottom 17 of the hopper and is keyed or otherwise fastened to the distributor plate 38, whereby rotation of the shaft will rotate the distributor plate. Therefore, the distributor plate is rotatable within the hopper between the stationary cover plate 32 and the stationary bottom 17 of said hopper.

Assuming that the corn is to be introduced into the compartment A, while the beans are introduced into the compartment B, it will be seen that the seeds in the respective compartments will fall into the slots 35 and 36. As the distributor plate 38 rotates beneath the cover plate 32 it will be seen that the corn in the slot 35 will enter the openings 39 in said distributor plate, while the beans in the slot 36 will enter the opening 40 in said plate. As each opening passes from beneath its respective slot, the seed will be scraped off of the distributing plate, except that portion of the seed which is in the openings 39 and 40, and kept in its compartment by a scraper blade 41 which is located at each end of the slots 35 and 36. The details of the scraper blade are shown in Figures 8 and 9. The lower end of the blade rides on the upper face of the distributor plate 38 extending through the slot in the cover plate. The upper end of the blade is pivoted on a pin 42 which extends across or through a housing 43 mounted on top of the cover plate 32. As can be seen in Figure 8, a spring 44 is bent upon itself to form a yoke which overlies the central portion of said blade. The spring is coiled around the shaft 42 and its extremities curve upwardly and contact a cover 45 which closes the top of the housing; with such arrangement, the spring exerts the pressure to urge the blade downwardly into engagement with the distributing plate. The cover is secured to the housing by a tap screw 45' which extends through the same and is threaded in a threaded opening 46 provided for the purpose.

The action of the wiper blades is obvious for as the seed are carried around through the slot by the distributing plate 38, some of these seed will enter the openings in said distributor plate. The remaining seed will lie on the surface of said plate and will be carried around through the slot and as it strikes the scraper blade 41 this seed will be moved upwardly into the compartment, whereby the seed is prevented from passing into the groove which is in registration with the slot. Therefore, it will be seen that the scraper blades serve to hold the seed in the compartment in which it has been introduced.

The seed which has entered the openings 39 and 40 in the distributor plate will, of course, remain in said openings because said seed cannot fall therethrough because of the bottom 17 of the hopper. Therefore, the seed within the openings will be carried around as the plate 38 rotates. The seeds within the openings 39 which are those seeds from the compartment A of the hopper will pass beneath a pivoted dog 47 which dog is mounted within a housing 48 secured on the cover plate 32. The dog is pivoted on a transverse pin 50 fastened in the walls of the housing and a spring 51 has a yoke-shaped portion which overlies the dog. The spring is wound around the pin and has its ends engaging the closure 52 of the housing 48, whereby said spring urges the dog downwardly. As is clearly shown in Figure 7, the dog 47 extends through an opening 49 in the cover plate and normally rides on the upper surface of the distributor plate, being held in contact therewith by the spring 51.

The lower end of the dog is rounded and the dog is so located in the plate 32 that the opening 39 in the distributor plate 38 will pass therebeneath as the plate rotates. Thus, it will be seen that the seed which has been trapped in the opening 39 will be carried around by the rotation of the plate 38 until the opening passes beneath the dog 47 at which time said dog enters the opening 39 and forces the seed which is therein downwardly from said opening. Immediately below the dog 47 is the outlet opening or slot 27 in the bottom 17 of the hopper. In this opening is located the upper end of the inclined outlet chute 29 whereby the seed which is forced from the opening 39 in the distributor plate is dropped downwardly into the inclined chute 29.

A similar arrangement for ejecting the seeds from the inner opening 40 in the distributor plate is provided. A dog 53 similar in every detail to the dog 47 is mounted on the cover plate 32 in alinement with the opening 40. Also disposed in alinement with the opening 40 and mounted in the outlet opening 27 in the bottom 17 of the hopper is the upper end of the vertical chute 28 whereby the seeds which are ejected from the openings 40 by the dog 53 will drop into the vertical chute 28. Thus, it will be seen that as the distributor plate 38 rotates, the seed from the separate compartments A and B of the hopper will enter the openings 39 and 40 of said plate and will be deposited or directed to the respective outlet chutes 28 and 29. With this arrangement, the seeds in the compartment B will be ejected from the outlet 28, while the seeds in the compartment A will be ejected from the chute 29.

The distributor plate 38 may be rotated by any suitable means but it is preferable to mount a bevelled gear 54 on the lower end of the stub shaft 41'. When the hopper 16 is in its lowermost position as shown in Figure 1, the gear 54 is in engagement with a pinion 55 which pinion is mounted on a shaft suitably connected and supported by the frame 10. The outer end of the shaft is provided with a suitable sprocket wheel over which an endless drive chain 56 passes. The chain 56 also passes over a sprocket wheel which is suitably mounted on the axle 11'. With this arrangement, it will be seen that as the traction wheel rotates due to the device being moved forwardly along the ground, the axle 11' will rotate the sprocket which in turn will rotate the gear 55 through the medium of the chain 56. Rotation of the gear 55, of course, will rotate the shaft 41' and the distributing plate 38.

As has already been noted, the invention is not to be limited to any particular type of distributing plate as the particular construction of the plate depends entirely upon the seed to be planted. In Figure 11, there is shown a modified form of distributor plate 57 which plate is particularly adapted for use in the planting of cotton seed. This plate is formed with a plurality of notches 58 in its marginal edge portion and a plurality of openings 59 which are located on a smaller diameter than on the notches 58. The outer notches 58 are in alinement with the outer groove 33 and arcuate slot 35 in the cover plate 32, while the inner openings 59 are in alinement with the inner groove 34 and inner slot 36. It will be obvious that the cotton seed which enters the opening 59 will be ejected from said opening by the dog 53 and will escape through the vertical chute 28. The cotton seed entering the slot 58 will be ejected by the dog 47 into the inclined chute 29. Various types of distributing plates may be used dependent upon the type of seed which is to be planted. The operation of the hopper is the same in all cases, that is, the distributing plate, no matter what its structure may be, is rotatable while the cover plate 32 is stationary, as is the bottom 17 of the hopper.

It is pointed out that two species or varieties of seed may be planted in the same furrow at one time by this hopper, whereby a special hopper or two hoppers are unnecessary and are obviated. By removing the partition 37 from the hopper, which may be easily and quickly done, said hopper may be converted into a one-seed hopper. Thus, the hopper is readily convertible to the type of hopper desired.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent, is:

1. A seed hopper including, a casing, a vertical partition within said casing, said partition dividing said casing into two compartments, a stationary plate within the casing spaced from the bottom thereof and having slots therein whereby seed within the two compartments of the hopper may fall into said slots said stationary plate being formed with annular grooves in its under side in alignment with said slots whereby the passage of seeds beneath the stationary plate is facilitated, a distributor plate in the space between the stationary plate and bottom and having openings therein in vertical alinement with said slots, means for rotating said distributor plate whereby the seeds from the slots may enter said openings and be carried around beneath the stationary plate, spring-pressed scraper members carried by the stationary plate and adapted to remove excess seed from the upper surface of the distributor plate and allow only the seed within the openings and the distributor plate to pass onwardly, spring-pressed means carried by the stationary plate and adapted to enter the openings in the distributor plate so as to force the seed from said openings, the casing having outlets immediately below the spring means whereby seed forced from the openings and distributor plate may escape from the hopper, and chutes leading from the outlets for discharging the seed onto the ground.

2. A seed hopper including, a casing, a vertical partition within said casing, said partition dividing said casing into two compartments, a stationary plate within the casing spaced from the bottom thereof and having a pair of slots therein whereby seed within the two compartments may fall into the slots beneath said compartments said stationary plate being formed with annular grooves in its under side in alignment with said slots whereby the passage of seeds beneath the stationary plate is facilitated, a distributor plate in the space beneath the stationary plate and bottom and having openings therein in alinement with said slots, means for rotating said distributor plate whereby the seed from the slots may enter said openings and be carried around beneath the stationary plate, a pair of spring-pressed scraper members carried by the stationary plate and adapted to remove excess seed from the upper surface of the distributor plate and allow only the seed within the openings and the distributor plate to pass onwardly, a pair of spring-pressed means carried by the stationary plate and adapted to enter the openings in the distributor plate so as to force seed from said openings, the casing having a pair of outlets immediately below said spring means whereby the seed forced from the openings into the distributor plate may escape from the hopper the seed from one compartment passing out through one opening and the seed from the other compartment passing out the other opening, and a pair of chutes leading from the outlets for discharging the seed onto the ground whereby the two different types of seeds may be delivered onto the ground in separate streams and at different points with relation to the hopper.

WILLIAM E. DEAN.